United States Patent [19]

Constien et al.

[11] Patent Number: 4,541,935

[45] Date of Patent: Sep. 17, 1985

[54] HYDRAULIC FRACTURING PROCESS AND COMPOSITIONS

[75] Inventors: Vernon G. Constien, Sperry; Milton T. King, Tulsa, both of Okla.

[73] Assignee: The Dow Chemical Company, Midland, Mich.

[21] Appl. No.: 440,198

[22] Filed: Nov. 8, 1982

[51] Int. Cl.$^4$ .............................................. E21B 43/26
[52] U.S. Cl. ................................. 252/8.55 R; 166/308
[58] Field of Search ....................... 252/8.55 R, 8.5 C; 524/419

[56] References Cited

U.S. PATENT DOCUMENTS

| | | | |
|---|---|---|---|
| 3,022,248 | 2/1962 | Anderson et al. | 252/8.55 X |
| 3,739,848 | 6/1973 | Lawson et al. | 166/274 |
| 3,922,173 | 11/1975 | Misak | 252/8.55 X |
| 4,250,044 | 2/1981 | Hinkel | 252/8.55 |
| 4,432,881 | 2/1984 | Evani | 252/8.5 |

FOREIGN PATENT DOCUMENTS 2088435  6/1982  United Kingdom ............... 252/8.55

*Primary Examiner*—Herbert B. Guynn

[57] ABSTRACT

Improved fracturing processes are described which use novel aqueous hydraulic fracturing fluids. The fluids comprise: (a) an aqueous medium, and (b) a thickening amount of a thickener composition comprising (i) a water-soluble or water-dispersible interpolymer having pendant hydrophobic groups chemically bonded thereto, (ii) a nonionic surfactant having a hydrophobic group(s) that is capable of associating with the hydrophobic groups on said organic polymer, and (iii) a water-soluble electrolyte. Additionally, the fluids preferably contain a stabilizing amount of a thiosulfate salt. As an example, an interpolymer of acrylamide and dodecyl acrylate was used in combination with a nonionic surfactant (HLB of about 10 to about 14) to thicken a dilute aqueous solution of KCl and sodium thiosulfate; the aqueous solution had excellent properties for use as a high temperature hydraulic fracturing fluid.

11 Claims, No Drawings

HYDRAULIC FRACTURING PROCESS AND COMPOSITIONS

BACKGROUND OF THE INVENTION

1. Field of the Invention

This invention pertains to novel compositions of matter and methods of using same in fracturing a subterranean formation penetrated by a wellbore.

2. Description of the Prior Art

Hydraulic fracturing is a term that has been applied to a variety of methods used to stimulate the production of fluids (e.g. oil, natural gas, brines, etc.) from subterranean formations. In hydraulic fracturing, a fracturing fluid is injected down a wellbore and against the face of the formation at a pressure and flow rate at least sufficient to overcome the overburden pressure and to initiate and/or extend a fracture(s) into the formation. The fracturing fluid usually carries a proppant (e.g. 20-40 mesh sand, bauxite, glass beads, etc.) into a fracture which keeps the formation from closing back down upon itself when the pressure is released. The proppant-filled fractures provide permeable channels through which the formation fluids can flow to the wellbore and thereafter be withdrawn. Hydraulic fracturing has been used for many years as a stimulation technique and extensive work has been done to solve problems present at each stage of the process. For example, the fracturing fluid is exposed to high temperatures and/or high pump rates and shear which can cause the fluids to degrade and to prematurely "drop" the proppant before the fracturing operation is completed. Considerable effort has, therefore, been spent trying to design fluids that will satisfactorily meet these rigorous conditions.

A wide variety of fluids has been developed, but most of the fracturing fluids used today are aqueous-based liquids which have been either gelled or foamed.

Aqueous gels are usually prepared by blending a polymeric gelling agent with an aqueous medium. Most frequently, the polymeric gelling agent of choice is a solvatable polysaccharide. These solvatable polysaccharides form a known class of compounds which include a variety of natural gums as well as certain cellulosic derivatives which have been rendered hydratable by virtue of hydrophilic substituents chemically attached to the cellulose backbone. The solvatable polysaccharides therefore include galactomannan gums, glycomannan gums, cellulose derivatives, and the like.

The solvatable polysaccharides have a remarkable capacity to thicken aqueous liquids. Even small amounts are sufficient to increase the viscosity of such aqueous liquids from 10 to 100 times or more. In some instances, the thickened aqueous liquid has sufficient viscosity to carry the proppant during the course of the fracturing process and represents a satisfactory fracturing fluid. In other instances, however, it is necesssary to crosslink the polysaccharide in order to form a gel having sufficient strength and viscosity to carry the proppant. A variety of crosslinkers have been developed to achieve this result at different pH ranges.

The borate ion has been used extensively as a crosslinking agent for hydrated guar gums and other galactomannans to form aqueous gels used in fracturing and other areas. For example, Kern described a crosslinked system in U.S. Pat. No. 3,059,909 which was used extensively in the oil and gas industry as a fracturing fluid. A fracturing process which comprised crosslinking, guar-containing compositions on-the-fly with a borate crosslinker was described by Free in U.S. Pat. No. 3,974,077. The borate-crosslinked systems require a basic pH (e.g. 8.5 to 10) for crosslinking to occur.

Other crosslinking agents were developed using certain transition metals. Chrisp described certain of these crosslinked systems in U.S. Pat. No. 3,202,556 and U.S. Pat. No. 3,301,723. In U.S. Pat. No. 3,202,556, aqueous solutions of galactomannan gums were crosslinked at a pH of from about 5 to 13 with antimony or bismuth crosslinkers. In U.S. Pat. Nos. 3,301,723 Chrisp described the use of certain titanium, zirconium, and other transition metals as crosslinking agents for galactomannan gums at a pH also in the range from about 6 to about 13. In both Chrisp patents, a basic pH was used to prepare crosslinked materials having utility in the explosive industry.

Another patent which described the use of titanium crosslinkers for solvatable polysaccharides was Tiner et al. (U.S. Pat. No. 3,888,312). The crosslinked gels formed by Tiner were said to be useful as fracturing fluids. The use of such crosslinked gels was alleged to overcome the high friction loss experienced during the pumping of many high viscosity fracturing fluids previously known. This observation corroborated the disclosure by Chrisp in U.S. patent No. 3,301,723 at column 10 that crosslinked gels formed using titanium, chromium, iron, and zirconium crosslinkers had a high surface tension (i.e. stickiness and tackiness are absent), ready workability and other desirable physical characteristics.

A class of thickeners was recently described by Syamalarao Evani in U.S. Pat. application Ser. No. 232,327, filed Feb. 6, 1981, now U.S. Pat. No. 4,432,881, entitled "Water-Dispersible Hydrophobic Thickening Agent"; the disclosure of which is incorporated herein by reference, Evani alleged broadly that such thickeners would be useful in a variety of fluids, including fracturing fluids.

Reference is made to the "Handbook of Water-Soluble Gums and Resins" by Robert L. Davidson, Editor, as published by McGraw-Hill, Inc. (1980) for an excellent treatise on water soluble polymers which includes a discussion on hydratable (or solvatable) polysaccharides. Reference is also made to "Hydraulic Fracturing" by G. C. Howard and C. R. Fast, Monograph Volume 2, Henry L. Doherty Series, published by the Society of Petroleum Engineers (1970) which is an excellent introduction to the subject of hydraulic fracturing, even, though it is now somewhat dated.

SUMMARY OF THE INVENTION

In the process of fracturing a subterranean formation penetrated by a wellbore by injecting a hydraulic fracturing fluid through the wellbore and against the formation at a flow rate and pressure at least sufficient to initiate and/or extend a fracture into the formation, an improvement has been discovered. The improvement comprises using as the hydraulic fracturing fluid a novel aqueous composition having chemical and physical properties sufficient to render it useful as a hydraulic fracturing fluid at 275° F., said composition comprising:
  A. an aqueous medium; and
  B. a thickener composition in an amount sufficient to increase the viscosity of said aqueous medium, said thickener composition comprising:
    (1) a water soluble or water dispersible interpolymer having pendant hydrophobic groups chemically bonded thereto and containing, in interpolymerized form, from about 99.0 to about 99.4 mole percent of a water soluble monomer or mixture of such monomers and from about 1.0 to about 0.6 mole percent of a water insoluble monomer or mixture of such monomers, (2) a water soluble or water dispersible nonionic surfactant having an HLB of from about 10 to about 14 and having a hydrophobic group capable of associating with the hydrophobic groups on said interpolymer, and (3) a water soluble electrolyte.

These novel compositions contain species of thickeners within Evani's generic description.

The novel fluids are superior to the commercial fracturing fluids which contain organometallic crosslinked guar or hydroxypropylguar. The fluids of this invention can be easily formulated to achieve an acceptable initial viscosity, and the initial viscosity will be retained by the fluid for an extended time even under conditions of high temperature and/or shear. The stable rheology of the present fluids will result in better fracturing treatment design and control of the fracture geometry and proppant placement.

DETAILED DESCRIPTION OF THE INVENTION

The new fluid compositions are formulated by blending the aqueous medium with the thickener compositions.

The aqueous medium is usually water, dilute acid (e.g. up to about 10 percent hydrochloric acid), aqueous alkanols (e.g. aqueous $C_1$ to $C_3$ alkanols), and the like. Water is preferred.

The thickener composition comprises a water soluble or water-dispersible interpolymer having pendant hydrophobic groups chemically bonded thereto. The interpolymer contains, in interpolymerized form, from about 99.0 to about 99.4 mole percent of a water soluble monomer or mixture of such monomers and from about 1.0 to about 0.6 mole percent of a water insoluble monomer or mixture of such monomers. Evani, supra, generically described there interpolymers (or copolymers, as they are sometimes referred to) and a method(s) for preparing such interpolymers. Any of the interpolymers described by Evani can be used herein so long as the polymer chosen meets the above-stated criteria. Preferred interpolymers are vinyl addition polymers in which two or more vinyl monomers with ethylenic unsaturation are reacted together under polymerization conditions. Of these, polymers containing at least one of the water soluble monomers represented by formula I are preferred;

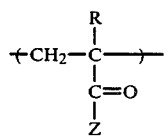

where R is hydrogen or methyl and Z is $-NH_2$, $-OH$, $-OR'$ where R' is a $C_1$-$C_4$ alkyl group, $-NH-R'-SO_3M$ wherein R'' is an alkylene group of from 1 to about 24 carbon atoms (preferably $C_1$ to $C_4$ alkylene) and M is hydrogen or an ammonium or alkali metal ion. Also preferred are those vinyl addition polymers which contain at least one water insoluble monomer represented by formula II;

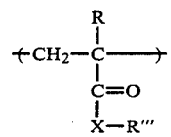

where R is hydrogen or methyl; X is $-O-$ or $-NH-$; and R''' is a hydrophobic group. R''' is preferably an aliphatic hydrophobic group (e.g. an alkyl or alkenyl group of from about 6 to about 24 carbon atoms or an inertly-substituted such group, etc.) and is most preferably an alkyl group of from about 8 to about 24 carbon atoms.

The interpolymers are usually solid polymers having a number average molecular weight of about one million or more. It has been found that such polymers are more readily dispersed/dissolved into the aqueous medium when ground to a mesh size of at least about 60. E.g. a mesh size of about 60-80 works quite well.

The thickener composition also comprises a nonionic surfactant having a hydrophilic-lipophilic balance (HLB) of from about 10 to about 14, and preferably from about 11 to about 12. Such nonionic surfactants constitute a known class of compounds having many members, any of which can be used herein. This class of compounds is illustrated, for example, in the handbook of McCutcheons, Combined Edition (published by McCutcheons' Division, MC Publishing Company, Glen Rock, N.J.). Blends of nonionic surfactants can be used, if desired. Blends of nonionic surfactants and anionic surfactants can also be used, and generally are when the interpolymer is a vinyl addition polymer prepared by the preferred process in Evani. In Evani's process, an anionic surfactant (e.g. sodium lauryl sulfate) is used as an emulsifying agent during the emulsion polymerization and it is present in the dried polymer product.

The nonionic surfactants are prepared in many instances by reacting ethylene oxide with a compound having active hydrogen (i.e. active in the Zerewitinoff reaction) and are referred to as "ethoxylated" compounds. For example, nonionic surfactants have been prepared by reacting ethylene oxide with alcohols, amides, alkylated-phenols, etc. Preferred nonionic surfactants are ethoxylated aliphatic alcohols, and most preferred are ethoxylated alkanols having from about 8 to about 24 carbon atoms in the alkanol moiety.

The thickener composition additionally comprises a water-soluble electrolyte. The electrolyte can be any of the known class of water-soluble electrolytes. This class includes simple salts of inorganic and organic acids where the cation and/or anion are monovalent or polyvalent (e.g. NaCl, $CaCl_2$, Na acetate, etc.). Preferably, however, the electrolyte is a monovalent inorganic salt (i.e. both the cation and anion are monovalent); and among these, the sodium, potassium and ammonium halides are a preferred sub group. Potassium chloride is the electrolyte of choice in most instances where the fluid composition is to be used as a fracturing fluid.

The relative amounts of the above-named components in the thickener composition can be varied, generally, however, the interpolymer is included in amounts of from about 0.3 to about 1.5 weight percent, based on weight of aqueous medium; a preferred amount is from about 0.4 to about 1.0 weight percent. The nonionic surfactant is normally included in amounts of from about 0.06 to about 0.3 weight percent, and preferably from about 0.08 to about 0.2 weight percent, based on weight of aqueous medium. The water-soluble electrolyte is normally used in amounts of from about 0.5 weight percent to about 4 weight percent, based on weight of aqueous medium and preferably in amounts of from about 0.75 to about 1.5 weight percent. From Evani's disclosure, it was a surprise to discover that elevated viscosity fluids could be obtained with the above thickener compositions which utilize substantially lower surfactant levels and that the initial viscosity level could be increased or decreased by adjusting the electrolyte content and/or the hydrophobe content rather than the surfactant concentration. The result of this discovery is increased polymer efficiency and thermal/shear stability at electrolyte (e.g. salt) concentrations normally associated with fracturing fluids.

The pH of the fracturing fluids can be varied, but is usually selected in the range of from about 6 to about 10. The fluids tend to be more stable at higher temperatures (e.g. 300° to 375° F.) where the pH is alkaline. The pH is preferably from about 8 to about 10 for high temperature applications.

A wide range of additives can be included, if desired, into the present fracturing fluids. For example, one can include a proppant material (e.g. 20-40 mesh sand, bauxite, glass beads, etc.), fluid loss additives (e.g. silica flour, kerosene, diesel, etc.), "energizing" gases (e.g. nitrogen, carbon dioxide, air, etc.) which are comingled with the fluids, breakers (e.g. persulfate salts, etc.) which reduces the viscosity of the fluid after a period of time, foaming agents (all foaming agents are surfactants, but not vice versa), crosslinking agents (e.g. aldehydes, polyvalent metal ions, etc.), stabilizers (e.g. methanol, an alkali metal or ammonium thiosulfate, etc.), and the like. The amount of additive(s) included can be varied to fit the particular need so long as a minimum amount is included to perform the desired function. It is easily within the expertise of one skilled in the fracturing art to determine such quantities.

The skilled artisan will also know that some additives (e.g. an alkali metal or ammonium thiosulfate) are also water soluble electrolytes and, as such, will influence the fluid rheology as noted above. As a related aside, the water soluble thiosulfate salts were particularly efficient in stabilizing the present fracturing fluids against thermal degradation and subsequent loss of viscosity. Hence, it is advantageous to include the thiosulfate salts in small but stabilizing amounts. The alkali metal thiosulfates and ammonium thiosulfate are preferred, based on commercial availability and cost effectiveness.

The method of formulating the fracturing fluid can also be varied to convenience. The components can be "batch mixed" or blended in a "continuous" manner. For example, the thickener composition or components thereof can be added to the aqueous medium in a fracturing tank or similar vessel and the contents of the tank circulated with a pump until thorough blending is achieved. Preferably, however, the fracturing fluids are prepared by a continuous process in which at least one of the components of the thickener (preferably, the interpolymer and/or the soluble electrolyte) is added "on-the-fly" while the fluid is being pumped into the wellbore. The reason for this preferance is the lower viscosity of the fluid without one of the key ingredients in the thickener. This makes it easier to pump the fluid out of its reservoir with lower hydraulic horsepower requirements. After the material is flowing in the pipeline, it is convenient to add the ingredient(s) and additives to the flowing stream by conventional means; e.g. through a "T" joint of a "Y" joint in the conduit, usually on the discharge side of the high pressure pump(s). Proppant and fluid loss additives, such as kerosene or diesel, are usually added downstream after the aqueous medium and thickener composition have been blended together.

After the fracturing fluid is formulated, it is injected through the wellbore against the face of the formation at a flow rate and pressure sufficient to initiate and/or extend a fracture(s) into the subterranean formation. This is a conventional practice and the methods/hardware of implementing the fracturing process are known. In most fracturing processes, it is routine practice to inject a pad fluid of the same composition (or compatible composition) to establish injectivity and/or to initiate the fracture ahead of the fluid bearing the proppant. Examples of such compatible pad fluids include, aqueous ammonium chloride, dilute hydrochloric acid (e.g. 1–5 percent), stiff stable foam having a Mitchel foam quality of 0.60 to 0.85, etc. The use of a fracture pad fluid is good technique and is recommended in conjunction with the use of the present fracturing fluids. Overflush fluids are also normally used and are recommended. Overflush fluids are also of the same composition (or compatible composition) but do not contain proppant. Such overflush fluids are used to clear the conduit and piping in the borehole of proppant-laden fluid and to force the proppant as far into the fracture as possible. The overflush fluid can be the same as the pad fluid or different.

EXPERIMENTAL

The following experiments will further illustrate the invention.

Preparation of the Interpolymers

The method of preparation described by Evani was used to prepare interpolymers of acrylamide and dodecyl methacrylate. In this procedure, dodecyl methacrylate is emulsified in deionized water containing sodium laurylsulfate as an emulsifier and a nonionic surfactant $C_{13}H_{27}O-CH_2CH_2O-_6H$, i.e. the condensation product of 6 moles of ethylene oxide onto tridecanol (HLB 11.4). Acrylamide monomer is added to this emulsion, followed by a chelant (Versenex 80), a free radical catalyst (Vazo 64), and sufficient dilution water to increase the volume of the reaction mixture to 250 milliliters. The citrate bottle containing the reaction mixture was then purged several times with nitrogen, sealed, and placed in a hot water bath (60° C.) for periods of from 4 to 16 hours. After this heating period, the reaction mixture was removed from the citrate bottle and volatiles were stripped from the polymerization product using a heated drum drier. The resulting dried interpolymer, i.e. the reaction product obtained after the volatiles were removed, was thus obtained as a tough thin film which was later shredded to a desired "particle" size or small flakes. In some instances, the dried interpolymer film was ground to a smaller and more definite particle size which passed thorugh a 60 mesh sieve. To further illustrate this method of preparation, one such reaction mixture contained acrylamide (46.8 parts of a 51.9 weight percent solution of acrylamide monomer in water), dodecyl methacrylate (0.7 parts), sodium laurylsulfate (25 parts of a 10 weight percent solution of sodium laurylsulfate in water), nonionic surfactant $C_{13}H_{27}O$—$C_2H_5O$—$_6H$ (5 parts; Trycol TDA 6 by Emery Chemical Co.), chelant (2.5 parts of a 2 weight percent solution of Versenex in an aqueous acetic acid solvent), Catalyst (1 part of Vazo 64; azobisisobutyronitrile in t-butanol solvent) and water of dilution. This reaction mixture was purged with nitrogen and processed as noted above to give the interpolymer used in Example 1.

The relative amounts of acrylamide and dodecyl methacrylate were varied in other instances to give interpolymers having different mole percents of the two monomers. Otherwise, the methods of preparation were maintained essentially the same.

Rheology—Testing Procedures

The rheology of the fracturing fluid formulations was determined on a Fann 50C viscometer. Such viscometers are commercial instruments and are widely used in the industry. In this instrument, the sample (50 cc) is loaded into a chamber (cup), a bob equipped with torque-recording means is immersed in the sample, the chamber containing the sample is pressurized, (400 psi), and the chamber is then rotated at a constant rate of rotation for a pre-determined period of time. An electronic reading is then recorded showing the amount of torque on the bob which results from the fluid being sheared by the rotating sample cup. Usually the temperature of the sample is increased at a constant rate to the desired test temperature as well. The experimental data from the Fann 50C runs are mathematically treated using the classical Power Law Fluid Model equations. In this mathematical treatment the data are plotted on a graph of log (shear stress) as the Y-axis vs log (shear rate) as the X-axis. The experimental points approximate a straight line in this graphical representation; the slope of this straight line is identified as n (the "behavior index") and the intercept with the Y-axis is identified as $K_v$ or $K_{viscometer}$ (the "consistency index"). $K_{viscometer}$ is converted to $K_{(pipe\ flow)}$ by the equation $$K_{(pipe\ flow)} = K_v \frac{(3n + 1)n}{4n}.$$

Once the Power Law constants n and K' have been determined, the apparent viscosity at any given shear rate is calculated using the equation:

$$\text{Viscosity (cps)} = \frac{47,800\ K}{(\text{shear rate})^{1-n}}.$$

The constant n (or n' in some literature reports) is related to the Newtonian behavior of the fluid. If n is 1, then the fluid is called a Newtonian fluid; if n is less than 1, then the fluid is not Newtonian in its behavior. The constant K (or K' in some literature reports) is a measure of initial viscosity at one (1) reciprocal second shear rate. From the above equation it is seen that K is directly proportional and is considered an important factor when assessing the proppant transport capacity of the fluid, for example.

An "ideal" fracturing fluid is presently envisioned as one having a constant, high viscosity ($n \cong 0$; $K \neq 0$) until the fluid has created the fracture and/or positioned the proppant in the fracture, and then instantaneously "breaks" to form a liquid having a viscosity the same as water, or less ($n = 1$; $K \cong 0$). Such "ideal" fluids are not presently available, but the fracturing fluids of this invention are surprisingly temperature and shear stable and can be tailored to meet various viscosity requirements.

Preparation of the Fracturing Fluids

The test fluids were formulated by adding, with stirring and low heat, the dried and shredded interpolymer to a water solution usually containing small amount of KCl (about 0.1 to 0.2 weight percent) and a nonionic surfactant $C_{12}H_{25}O$—$(CH_2CH_2O)_{10}H$ to assist in dispersion and hydration. Stirring was continued until a smooth homogeneous mixture was obtained. Aliquots of this masterbatch solution were then diluted with water containing various levels fo KCl and other additives, such as sodium thiosulfate, to give the fracturing fluid formulations tested below, each of which contained 0.12 weight percent sodium thiosulfate.

EXAMPLES 1–31

In all of these examples, the test formulations were prepared as noted above and the rheology was determined at 275° F. at a shear rate of 170 and/or 511 reciprocal seconds. The test formulations and rheology data are summarized in Table I. All percentages are weight percentages. To further illustrate the preparation of the test formulation, in Example 1 the interpolymer (2 grams, g) containing a mole ratio of acrylamide/dodecyl methacrylate of 99.4/0.6 was dissolved in 98 milliliters (mL) of an aqueous medium containing 96 mL of deionized water and 2 mL of a 1 weight percent solution of a nonionic surfactant $C_{12}H_{25}O$—$(C_2H_5O)_{10}H$ in water, and 0.2 g of KCl using slow stirring and mild heat; this gave the solution masterbatch. Fifty (50) mL of this masterbatch was diluted with 50 mL of a solution containing 2 weight percent of KCl and 0.24 weight percent of sodium thiosulfate in water; this gave the test formulation as a liquid solution containing 1.0 weight percent interpolymer, 2.1 weight percent KCl, 0.01 weight percent nonionic surfactant $C_{12}H_{25}O$—$(C_2H_5O)_{10}H$, and 0.12 weight percent sodium thiosulfate. The rheology in this test formulation was then determined as indicated above and reported as Example 1 in Table I. All test formulations had a pH of about 8 to 10.

TABLE I

| | Test Formulation - Components | | | | Rheology | | | | |
|---|---|---|---|---|---|---|---|---|---|
| | Interpolymer | | | | | | | | |
| Ex. | AAM/$C_{12}$* (Mole %) | Amount (wt. %) | KCl (wt. %) | Surfactant (wt. %) | n | K | 170 Sec$^{-1}$ | 511 Sec$^{-1}$ | Hours |
| 1. | 99.4/0.6 | 1.0 | 2.1 | 0.01 | .0949 | .4829 | 221 cps | 82 cps | 1 |
| | | | | | .1727 | .3296 | 225 | 91 | 2 |
| | | | | | .2127 | .2722 | 228 | 96 | 3 |
| | | | | | .3137 | .1547 | 218 | 103 | 4 |
| | | | | | .2769 | .1646 | 192 | 87 | 5 |
| | | | | | .3048 | .1368 | 184 | 86 | 6 |

TABLE I-continued

| | Test Formulation - Components | | | | Rheology | | | | |
|---|---|---|---|---|---|---|---|---|---|
| | Interpolymer | | | | | | | | |
| Ex. | AAM/C$_{12}$* (Mole %) | Amount (wt. %) | KCl (wt. %) | Surfactant (wt. %) | n | K | 170 Sec$^{-1}$ | 511 Sec$^{-1}$ | Hours |
| | | | | | .3131 | .1238 | 174 | 82 | 7 |
| 2. | 99.4/0.6 | 1.0 | 1.1 | 0.01 | .3540 | .1163 | 202 | 99 | 1 |
| | | | | | .4350 | .0626 | 164 | 88 | 2 |
| | | | | | .4313 | .0603 | 156 | 83 | 3 |
| 3. | 99.4/0.6 | 1.0 | 2.1 | 0.005 | .1522 | .3261 | 200 | 79 | 1 |
| | | | | | .1537 | .3369 | 209 | 82 | 2 |
| | | | | | .1814 | .2919 | 208 | 85 | 3 |
| | | | | | .1887 | .2800 | 208 | 85 | 4 |
| 4. | 99.4/0.6 | 1.0 | 4.3 | 0.01 | .3435 | .0733 | 120 | 59 | 1 |
| | | | | | .3087 | .0927 | 127 | 60 | 2 |
| | | | | | .3083 | .0927 | 127 | 59 | 3 |
| | | | | | .3885 | .0578 | 120 | 61 | 4 |
| | | | | | .3081 | .0919 | 126 | 59 | 5 |
| | | | | | .3192 | .0877 | 127 | 60 | 6 |
| | | | | | .3441 | .0589 | 97 | 47 | 7 |
| 5. | 99.4/0.6 | 1.0 | 1.0 | 0.0025 | .2696 | .2378 | 267 | 120 | 1 |
| | | | | | .2722 | .2345 | 267 | 120 | 2 |
| | | | | | .2691 | .2336 | 262 | 117 | 3 |
| 6. | 99.4/0.6 | 0.75 | 1.1 | 0.004 | .1404 | .2623 | 152 | 59 | 1 |
| | | | | | .1432 | .2405 | 141 | 55 | 2 |
| | | | | | .1465 | .2377 | 142 | 56 | 3 |
| | | | | | .1415 | .2499 | 145 | 57 | 1 |
| 7. | 99.4/0.6 | 0.5 | 0.58 | 0.0025 | .2225 | .0671 | 59 | 25 | 1 |
| | | | | | .2041 | .0946 | 76 | 32 | 2 |
| | | | | | .1701 | .1307 | 88 | 35 | 3 |
| | | | | | .1576 | .1409 | 89 | 35 | 4 |
| 8. | 99.3/0.7 | 1.0 | 4.3 | 0.01 | .3251 | .0798 | 119 | 57 | 1 |
| | | | | | .3285 | .0761 | 116 | 55 | 2 |
| | | | | | .3245 | .0794 | 118 | 56 | 3 |
| 9. | 99.3/0.7 | 1.0 | 1.1 | 0.0025 | .1346 | .6647 | 373 | 144 | 1 |
| | | | | | .1274 | .6118 | 331 | 127 | 2 |
| | | | | | .1458 | .5202 | 309 | 121 | 3 |
| | | | | | .1494 | .5031 | 305 | 120 | 4 |
| 10. | 99.3/0.7 | 1.0 | 2.1 | 0.0025 | .2975 | .0967 | 125 | 58 | 1 |
| | | | | | .3074 | .0828 | 113 | 53 | 2 |
| 11. | 99.3/0.7 | 0.75 | 1.1 | 0.0025 | .1374 | .2134 | 122 | 47 | 1 |
| | | | | | .1366 | .2268 | 129 | 50 | 2 |
| | | | | | .1504 | .2072 | 126 | 50 | 3 |
| | | | | | .1540 | .2010 | 125 | 49 | 4 |
| 12. | 99.3/0.7 | 0.50 | 0.58 | 0.25 | .2857 | .0317 | 39 | 18 | 1 |
| 13. | 99.2/0.8 | 1.0 | 1.1 | 0.0025 | .1514 | .4884 | 299 | 118 | 1 |
| | | | | | .1512 | .5159 | 315 | 124 | 2 |
| | | | | | .1603 | .4996 | 320 | 127 | 3 |
| | | | | | .1235 | .4401 | 318 | 130 | 4 |
| 14. | 99.2/0.8 | 1.0 | 4.3 | 0.0025 | .4910 | .0234 | 82 | 47 | 1 |
| | | | | | .5028 | .0223 | 83 | 48 | 2 |
| | | | | | .3393 | .0726 | 117 | 56 | 3 |
| | | | | | .3950 | .0489 | 105 | 54 | 4 |
| | | | | | .2666 | .1212 | 134 | 60 | 5 |
| | | | | | .2804 | .1090 | 129 | 59 | 6 |
| | | | | | .9857 | .0016 | 69 | 68 | 7 |
| 15. | 99.2/0.8 | 1.0 | 1.1 | 0.05 | .6318 | .0278 | 201 | 34 | 1 |
| | | | | | .5370 | .0485 | 215 | 129 | 2 |
| | | | | | .5019 | .0601 | 223 | 129 | 3 |
| | | | | | .4841 | .0673 | 227 | 129 | 4 |
| 16. | 99.2/0.8 | 1.0 | 2.1 | 0.0025 | .1079 | .5063 | 250 | 94 | 1 |
| | | | | | .2186 | .2648 | 229 | 97 | 2 |
| | | | | | .2178 | .2638 | 227 | 96 | 3 |
| | | | | | .2194 | .2662 | 231 | 98 | 4 |
| 17. | 99.2/0.8 | 0.75 | 1.1 | 0.0025 | .1107 | .3124 | 155 | 58 | 1 |
| | | | | | .1146 | .2930 | 148 | 56 | 2 |
| | | | | | .1085 | .3017 | 148 | 56 | 3 |
| | | | | | .1077 | .3040 | 149 | 56 | 4 |
| 18. | 99.0/1.0 | 1.0 | 4.3 | 0.005 | .3539 | .0706 | 122 | 60 | 1 |
| | | | | | .3525 | .0603 | 104 | 51 | 2 |
| | | | | | .3295 | .0808 | 123 | 59 | 3 |
| | | | | | .3141 | .0855 | 121 | 57 | 4 |
| | | | | | .3200 | .0745 | 127 | 60 | 5 |
| | | | | | .3485 | .0876 | 126 | 61 | 6 |
| 19. | 99.0/1.0 | 1.0 | 1.1 | 0.005 | .3502 | .2229 | 379 | 185 | 1 |
| | | | | | .2217 | .3908 | 343 | 146 | 2 |
| | | | | | .2856 | .2652 | 323 | 147 | 3 |
| | | | | | .3552 | .1651 | 288 | 142 | 4 |
| 20. | 99.0/1.0 | 1.0 | 1.1 | 0.0025 | .1133 | .7047 | 355 | 134 | 1 |
| | | | | | .1885 | .5080 | 376 | 154 | 2 |
| | | | | | .1745 | .5414 | 373 | 151 | 3 |
| | | | | | .2273 | .4018 | 363 | 155 | 4 |

TABLE I-continued

| | Test Formulation - Components | | | | Rheology | | | | |
|---|---|---|---|---|---|---|---|---|---|
| | Interpolymer | | | | | | | | |
| Ex. | AAM/$C_{12}$* (Mole %) | Amount (wt. %) | KCl (wt. %) | Surfactant (wt. %) | n | K | 170 Sec$^{-1}$ | 511 Sec$^{-1}$ | Hours |
| 21. | 99.0/1.0 | 1.0 | 1.1 | 0.01 | .7574 | .0059 | 81 | 62 | 1 |
| | | | | | .8373 | .0030 | 63 | 53 | 2 |
| | | | | | .8485 | .0025 | 55 | 47 | 3 |
| 22. | 99.0/1.0 | 0.75 | 0.61 | 0.0038 | .2378 | .1605 | 153 | 66 | 1 |
| | | | | | .1891 | .2601 | 193 | 79 | 2 |
| | | | | | .1749 | .3221 | 222 | 90 | 3 |
| 23. | 99.0/1.0 | 0.75 | 0.61 | 0.0038 | .2586 | .0849 | 90 | 40 | 1 |
| | | | | | .2372 | .1579 | 150 | 65 | 2 |
| | | | | | .2111 | .2109 | 175 | 74 | 3 |
| | Rheology on example 23 determined | | | | .1867 | .2717 | 199 | 82 | 4 |
| | at 300° F. instead of 275° F. | | | | .3816 | .0771 | 154 | 78 | 5 |
| | | | | | .1766 | .2739 | 191 | 77 | 6 |
| | | | | | .2407 | .1700 | 165 | 71 | 7 |
| | | | | | .2469 | .1579 | 158 | 69 | 8 |
| 24 | 99.0/1.0 | 0.75 | 2.1 | 0.004 | .4004 | .0292 | 64 | 33 | 1 |
| | | | | | .3667 | .0419 | 78 | 39 | 2 |
| | | | | | .3186 | .0636 | 92 | 43 | 3 |
| | | | | | .3246 | .0634 | 94 | 45 | 4 |
| | | | | | .3181 | .0720 | 104 | 49 | 5 |
| | | | | | .3085 | .0802 | 110 | 51 | 6 |
| | | | | | .2990 | .0874 | 114 | 53 | 7 |
| 25. | 99.0/1.0 | 0.75 | 1.1 | 0.004 | .1564 | .2777 | 174 | 69 | 1 |
| | | | | | .1821 | .2331 | 167 | 68 | 2 |
| | | | | | .1877 | .2614 | 193 | 79 | 3 |
| | | | | | .1761 | .2916 | 203 | 82 | 4 |
| | | | | | .1759 | .3139 | 218 | 88 | 5 |
| | | | | | .1887 | .3059 | 227 | 93 | 6 |
| 26. | 99.0/1.0 | 0.5 | 1.1 | 0.0025 | .4085 | .0121 | 28 | 14 | 1 |
| | | | | | .3308 | .0267 | 41 | 20 | 2 |
| | | | | | .2953 | .0410 | 53 | 24 | 3 |
| | | | | | .2818 | .0498 | 60 | 27 | 4 |
| 27. | 99.0/1.0 | 0.5 | 0.58 | 0.0025 | .2375 | .0547 | 52 | 23 | 1 |
| | | | | | .2287 | .0777 | 71 | 30 | 2 |
| | | | | | .2160 | .0986 | 84 | 36 | 3 |
| | | | | | .2060 | .1122 | 91 | 38 | 4 |
| 28. | 99.0/1.0 | 0.5 | 0.32 | 0.0025 | .1983 | .0436 | 34 | 14 | 1 |
| | | | | | .2175 | .0241 | 21 | 9 | 2 |
| | | | | | .3212 | .0092 | 14 | 6 | 3 |
| | | | | | .2789 | .0089 | 11 | 5 | 4 |
| 29. | 99.0/1.0 | 0.5 | 0.32 | 0.01 | .1842 | .0460 | 33 | 14 | 1 |
| | | | | | .0870 | .1848 | 81 | 30 | 2 |
| | | | | | .0699 | .2591 | 104 | 38 | 3 |
| | | | | | .0474 | .3620 | 130 | 46 | 4 |
| 30. | 99.0/1.0 | 0.5 | 0.58 | 0.01 | .3220 | .0275 | 40 | 19 | 1 |
| | | | | | .2964 | .0490 | 63 | 29 | 2 |
| | | | | | .3023 | .0518 | 69 | 32 | 3 |
| 31. | 99.0/1.0 | 0.5 | 0.58 | 0.005 | .2322 | .0695 | 64 | 28 | 1 |
| | | | | | .2918 | .0474 | 60 | 27 | 2 |
| | | | | | .2391 | .0907 | 87 | 38 | 3 |
| | | | | | .2281 | .1120 | 102 | 44 | 4 |

*"AAM/$C_{12}$" is mole ratio of acrylamide/dodecyl methacrylate

The typical laboratory test for determining the usefulness of a fracturing fluid is by determining the apparent viscosity of the fluid at temperature and at constant shear rate of 170 sec$^{-1}$ over a period of several hours. The fluid must maintain a minimum viscosity for the successful creation of the fracture and placement of proppant into the created fracture. Excessive viscosity is not desirable because it could lead to high friction pressures which can limit treatment designs due to hydraulic horsepower or pressure limitations. Also, some control of the geometry of the fracture may be achieved by carefully selecting fluid viscosity and pump rates. The minimum and maximum viscosities allowable for the fluid will vary depending on the individual treatment design which takes into consideration such things as formation properties, size of the desired fracture, amount of proppant to be placed, well temperature, and mechanical limitations. It is apparent that the minimum and maximum viscosity requiements for fluids can vary considerably; however, for laboratory evaluations some broad useful ranges can be identified. For the purposes of definition, we consider a fluid to be useful, as a fracturing fluid in this invention if it maintains apparent viscosity of at least about 30 centipoise (CPS) for at least 2 hours at 275° F. at a shear rate of 170 reciprocal seconds as measured on a Fann 50c viscometer. All of the above fluids in Examples 1–31 meet this standard.

What is claimed is:

1. In the process of fracturing a subterranean formation penetrated by a wellbore by injecting a hydraulic fracturing fluid through said wellbore and against said subterranean formation at a flow rate and pressure at least sufficient to initiate and/or extend a fracture into said formation, the improvement comprising using as said hydraulic fracturing fluid an aqueous composition having chemical and physical properties sufficient to render it useful as a hydraulic fracturing fluid at 275° F., said composition comprising:

A. an aqueous medium; and

B. a thickener composition in an amount sufficient to increase the viscosity of said aqueous medium, said thickener composition comprising:
(1) a water soluble or water dispersible interpolymer having pendant hydrophobic groups chemically bonded thereto and containing, in interpolymerized form, from about 99.0 to about 99.4 mole percent of a water soluble monomer or mixture of such monomers and from about 1.0 to about 0.6 mole percent of a water insoluble monomer or mixture of such monomers,
(2) a water soluble or water dispersible nonionic surfactant having an HLB of from about 10 to about 14 and having a hydrophobic group capable of associating with the hydrophobic groups on said interpolymer, and
(3) a water soluble monovalent inorganic salt, wherein said water soluble monomer or mixture of monomers is represented by the formula:

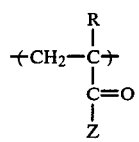

wherein R is hydrogen or methyl and Z is $NH_2$ or $NH-R''-SO_3M$, where R'' is an alkylene group of from 1 to 4 carbon atoms and M is hydrogen, an ammonium or alkali metal ion and said water insoluble monomer or mixture of monomers is represented by the formula:

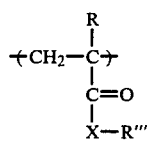

wherein X is —O— and R''' is an alkyl group of from about 8 to about 24 carbon atoms.

2. The process defined by claim 1 wherein said nonionic surfactant is an ethoxylated aliphatic alcohol.

3. The process defined by claim 2 wherein said nonionic surfactant is an ethoxylated alkanol; said alkanol having from about 8 to about 24 carbon atoms.

4. The process defined by claim 1 wherein said salt is an ammonium, sodium and/or potassium halide.

5. The process defined by claim 4 wherein said salt is KCl.

6. The process defined by claim 1 which additionally comprises a stabilizing amount of a water soluble thiosulfate.

7. The process defined by claim 6 wherein said thiosulfate is ammonium thiosulfate and/or an alkali metal thiosulfate.

8. The process defined by claim 1 wherein said fracturing fluid additionally comprises a normally liquid hydrocarbon as a fluid loss additive.

9. The process defined by claim 8 wherein said normally liquid hydrocarbon is kerosene or diesel oil.

10. The process defined by claim 1 wherein said fracturing fluid additionally comprises a particulate solid proppant.

11. An aqueous composition having chemical and physical properties sufficient to render it useful as a hydraulic fracturing fluid at 275° F., said composition comprising:
A. an aqueous medium; and
B. a thickener composition in an amount sufficient to increase the viscosity of said aqueous medium, said thickener composition comprising:
(1) a water soluble or water dispersible interpolymer having pendant hydrophobic groups chemically bonded thereto and containing, in interpolymerized form, from about 99.0 to about 99.4 mole percent of a water soluble monomer or mixture of such monomers and from about 1.0 to about 0.6 mole percent of a water insoluble monomer or mixture of such monomers,
(2) a water soluble or water dispersible nonionic surfactant having an HLB of from about 10 to about 14 and having a hydrophobic group capable of associating with the hydrophobic groups on said interpolymer, and
(3) a water soluble monovalent inorganic salt, wherein said water soluble monomer or mixture of monomers is represented by the formula:

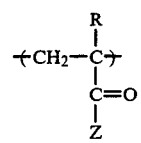

wherein R is hydrogen or methyl and Z is $NH_2$ or $NH-R''-SO_3M$, where R'' is an alkylene group of from 1 to 4 carbon atoms and M is hydrogen, an ammonium or alkali metal ion and said water insoluble monomer or mixture of monomers is represented by the formula:

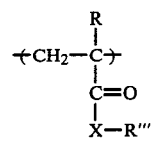

wherein X is —O— and R''' is an alkyl group of from about 8 to about 24 carbon atoms.

* * * * *